United States Patent [19]

Hiyoshi et al.

[11] Patent Number: 4,535,120
[45] Date of Patent: Aug. 13, 1985

[54] AQUEOUS DISPERSIONS OF VINYLIDENE CHLORIDE RESINS

[75] Inventors: Kazuhiko Hiyoshi; Norio Matsuura; Michiharu Matsuguchi, all of Nobeoka; Norio Onofusa; Tadao Nishikage, both of Yokohama, all of Japan

[73] Assignee: The Dow Chemical Company, Midland, Mich.

[21] Appl. No.: 301,806

[22] Filed: Sep. 14, 1981

[51] Int. Cl.$^3$ ............................................. C08L 33/06
[52] U.S. Cl. ...................................... 524/560; 524/831
[58] Field of Search ................ 260/29.6 TA; 524/560, 524/831

[56] References Cited

U.S. PATENT DOCUMENTS 3,108,017 10/1963 Messwarb et al. ............... 117/138.8
3,714,106 1/1973 Smith et al. ................. 260/29.6 TA
3,879,359 4/1975 Hinkamp et al. .............. 260/30.4 R

*Primary Examiner*—Joseph L. Schofer
*Assistant Examiner*—N. Sarofim
*Attorney, Agent, or Firm*—Dan R. Howard; Thomas J. Mielke

[57] ABSTRACT

An aqueous dispersion of vinylidene chloride resin which, when coated onto a synthetic resinous film substrate, has the combined properties of: (1) good adhesion to the substrate; (2) good adhesion of a printing ink to the coating; (3) satisfactory barrier to gases (especially oxygen) and water vapor; and (4) a high resistance to boiling water treatment. The vinylidene chloride resin must also have polymerized therein methyl methacrylate, methacrylonitrile and methacrylic acid. A total amount of methacrylic acid must be between $1 \times 10^{-4}$ and $3 \times 10^{-4}$ moles of methacrylic acid per gram of polymer solids. A portion of the total amount of methacrylic acid exists in a form titratable with a 1/20 Normal aqueous solution of sodium hydroxide. The portion must be the less of (a) about $1.3 \times 10^{-4}$ moles per gram of polymer solids or (b) about 60 percent of the total amount.

1 Claim, No Drawings

AQUEOUS DISPERSIONS OF VINYLIDENE CHLORIDE RESINS

BACKGROUND OF THE INVENTION

The present invention relates generally to an aqueous dispersion of a vinylidene chloride resin. More particularly, the present invention relates to an aqueous dispersion of a vinylidene chloride resin which has good adhesive properties and which is capable of forming a coating having a good printability. The coating also has an excellence in gas (especially oxygen) and water vapor barrier properties and in resistance to boiling water treatment.

Polypropylene, polyester, nylon or like plastic films show markedly improved barrier properties to gas and water vapor if coated with, either directly or through the medium of one or more anchor coats, an aqueous dispersion of a vinylidene chloride resin. Therefore, aqueous vinylidene chloride resin dispersions are valuably utilized as coatings for such plastic films.

The aqueous vinylidene chloride resin dispersions of the present invention must be capable of forming coatings which have good adhesive properties to substrate films and printability (i.e. their fitness for securing good adhesion of printing ink thereto). Said coatings must also have good laminatability to other films. A topmost requisite for such aqueous vinylidene chloride resin dispersions is a capability to form a coating having excellent barrier properties with respect to gas and water vapor.

Many foods or like products are now stored or sold as packed in vinylidene chloride resin-coated film bags. Some foods may require sterilization through boiling after being packed. Coated films which are subjected to sterilization must have a high resistance to a boiling water treatment. In other words, such coated films must undergo neither clarity loss nor reduction in gas barrier properties as a result of the boiling water treatment, while maintaining their excellence in the other aforementioned properties.

Accordingly, the present invention provides an improved aqueous vinylidene chloride resin dispersion which can generally satisfy the aforementioned requirements.

SUMMARY OF THE INVENTION

That is, the present invention provides an aqueous dispersion of a vinylidene chloride resin obtained by emulsion polymerizing a mixture of vinylidene chloride as a major component, methyl methacrylate, methacrylonitrile, and methacrylic acid; said aqueous dispersion having an aqueous phase and a polymer solids phase, the polymer solids phase having polymerized therein from about 87 to about 93 mole percent vinylidene chloride, based on polymer solids content, from about 13 to about 7 mole percent of a mixture of methyl methacrylate and methacrylonitrile, based on polymer solids content, and an amount of methacrylic acid, said amount together with a titratable amount of methacrylic acid comprising a total amount of methacrylic acid, the total amount being from about $1 \times 10^{-4}$ to about $3 \times 10^{-4}$ moles of methacrylic acid per gram of polymer solids content, the titratable amount being an amount which exists in a form titratable with a 1/20 Normal aqueous solution of sodium hydroxide, the titratable amount being the lesser of (a) about $1.3 \times 10^{-4}$ moles per grams of polymer solids content and (b) about 60 percent of the total amount of methacrylic acid.

DESCRIPTION OF THE PREFERRED EMBODIMENTS

As described immediately above, it is required that the polymer solids phase aqueous vinylidene chloride resin dispersion of the present invention have polymerized therein from about 87 to about 93 mole percent vinylidene chloride based on the polymer solids content. If the polymer solids phase has polymerized therein less than 87 mole percent vinylidene chloride, based on polymer solids content, a coating resulting therefrom will show reduced barrier properties with respect to gas and water vapor. If the polymer solids phase has polymerized therein more than 93 mole percent vinylidene chloride, based on polymer solids content, the aqueous dispersion will have a tendency to coagulate in a short time after preparation. It will also be difficult to obtain continuous clear films therefrom.

Also as described above, to secure good adhesion to substrates such as base films and anchor coats and to form a coating having a good printability, the aqueous vinylidene chloride resin dispersion of the present invention must contain a total amount of at least about $1 \times 10^{-4}$ mole methacrylic acid per gram of polymer solids content. A total amount of methacrylic acid of about $3 \times 10^{-4}$ mole, based on said polymer solids content, will provide such a good adhesiveness and printability. However, the aqueous vinylidene chloride resin dispersion can form such a coating also having desirably improved gas and water barrier properties and boiling water resistance only when the total amount of methacrylic acid is distributed between the polymer solids phase and the water phase of the aqueous dispersion in such a manner that the titratable amount is within a specific range, as mentioned previously.

In order to determine the titratable amount of methacrylic acid in the aqueous vinylidene chloride resin dispersion, the aqueous dispersion may be titrated directly with a 1/20N aqueous dispersion of sodium hydroxide in a manner to be described herein later. It is believed that only that methacrylic acid which exists in the water phase and in the vicinity of its boundary with the polymer solids phase, will respond to said titration. In accordance with the present invention, to secure a coating having a satisfactory boiling water resistance, it is required that the titratable amount of methacrylic acid must not exceed either about $1.3 \times 10^{-4}$ mole per gram of polymer solids content or about 60 percent of the total methacrylic acid content, whichever is smaller.

The aqueous vinylidene chloride resin dispersion of the present invention must contain both methyl methacrylate and methacrylonitrile in addition to methacrylic acid. If either methyl methacrylate or methacrylonitrile is lacking the resultant coating cannot have a satisfactory boiling water resistance. That is, said coating will not have high oxygen barrier properties after boiling water treatment as intended by the present invention.

In preparing the aqueous dispersions of the present invention, any known emulsifying agents, polymerization initiators, surfactants and like additives for preparing such dispersions of vinylidene chloride resin may be employed. However, such additives will remain in coatings formed therefrom and will result in reduced gas and water barrier properties and in lower boiling water resistance. Thus, it is desirable to limit the use of such additives to their minimum quantities. It is preferable to remove such additives from the aqueous dispersion by, for example, subjecting the dispersion to dialysis after emulsion-polymerization.

The present invention will be further illustrated by the following examples and comparative or reference experiments, in which the effects of the present were evaluated in terms of the properties and parameters to be described hereinbelow. All parts and percentages used herein are given on a weight basis unless otherwise specified. The examples and reference experiments are not to be taken as limiting the present invention.

(A) Chlorine content

Vinylidene chloride content in terms of constitutional units on a polymer solids basis in an aqueous dispersion of a vinylidene chloride resin was determined by measuring chlorine content of the polymer solids phase of the aqueous dispersion. A sample amount of the aqueous dispersion of the vinylidene chloride resin was dissolved in warm methanol and heavily agitated to break its colloidal state. A precipitate resulted which was then separated by filtration, washed and dried to be used as a test sample. To determine chlorine content of the test sample, a portion of the test sample was subjected to an analysis substantially in accordance with Schöniger's oxygen flask combustion method set forth in JIS K6722.

(B) Nitrogen content

Acrylonitrile content on a polymer solids basis in an aqueous dispersion of a vinylidene chloride resin was determined by measuring nitrogen content of the aqueous dispersion. That is, a part of the test sample prepared for the chlorine content analysis of the preceding paragraph (A) was analyzed by micro Kjeldahl method.

(C) Solid content

A sample of an aqueous vinylidene chloride resin dispersion was accurately weighted on an accurately weighed aluminum foil pan in an amount close to 1 gram (g) and allowed to dry in a circulating hot air dryer at 120° Centigrade (°C.) for 30 minutes. Sample weight loss was then measured to determine the solid content of the aqueous dispersion.

(D) Carboxyl group content

An aqueous dispersion of a vinylidene chloride resin was analyzed for carboxyl group content by conductrometric titration using a conductometric analyzer Model E365B (Metrohm). Samples were prepared and titrated as follows:

Titration A-Carboxyl group content of aqueous dispersion

A sample of an aqueous dispersion of vinylidene chloride resin in an accurately weighed amount close to 1 g was dissolved in 100 g of dimethylformamide. A solution resulted which was then titrated with a 1/10N dimethylformamide solution of cobalt acetate.

Titration B-Determination of carboxyl group content titratable with Sodium Hydroxide (NaOH) solution A sample of an aqueous dispersion of vinylidene chloride resin in an accurately weighed amount close to 2 g was diluted with 110 ml of deionized water. The thus diluted aqueous dispersion was titrated with a 1/20N aqueous solution of sodium hydroxide.

(E) Preparation of coated film

An oriented polypropylene film or polyester film subjected to corona discharge treatment was coated with a primer (HL220 Anchor Coat produced by Toyo Ink Mfg. Co., Ltd.) at a coating weight of about 0.2 grams/square meter (g/m$^2$), followed by drying. Then, an aqueous dispersion of a vinylidene chloride resin was coated on the dried primer coatings at a coating weight of about 5 g/m$^2$ by using a Mayer rod. The vinylidene chloride resin coating was then dried in a circulating hot air dryer at 100° C. for 30 seconds.

(F) Adhesiveness to substrates

An adhesive tape (Cellotape 12 mm wide, produced by Nichiban Co., Ltd.) was stuck onto a coated film immediately after it was prepared as described in the preceding paragraph (E). Then, the adhesive tape was rapidly torn off. As a result of this tearing, a coated film having its coating torn off by the tape was evaluated as unacceptable. A coated film of which could withstand the tearing was evaluated as acceptable.

(G) Applied printing ink adhesiveness (printability)

A coated film prepared in the manner as described in the paragraph (E) was left to stand in a thermostatic oven at 60° C. for 24 hours after preparation. Then, it was coated with white GNC ink (produced by Toyo Ink Mfg. Co., Ltd.) by means of a Mayer rod. After 60 seconds of drying at 60° C., an adhesive tape (Cellotape produced by Nichiban Co., Ltd.) was stuck onto the ink coating. Then, the adhesive tape was rapidly torn off. An area where the ink remained without being torn off by the tape was visually determined and shown in a Table which follows Reference 4 in terms of percentage of the total area of the ink coating.

(H) Oxygen permeability

An oriented polypropylene film, 22 microns thick, coated in the manner as described in paragraph (E) was allowed to stand by two days at room temperature at a relative humidity of 100 percent or treated in boiling water (see paragraph J). After the aforesaid 2 days or immediately after the boiling water treatment, oxygen permeability of the coated film was measured on an oxygen permeability tester OX-TRAN 100 (Modern Control) at 20° C. and at a relative humidity of 100 percent. The coated film had a coating weight of about 5 g/m$^2$.

(I) Water vapor permeability

An oriented polyester film, 12 microns thick, coated in the manner as described in paragraph (E) at a coating weight of about 5 g/m$^2$ water vapor permeability of the coated film was measured in accordance with JIS Z 0208. Since this measurement according to JIS Z 0208 is done in such a high temperature-humidity atmosphere (40° C. and relative humidity of 90%), the water vapor permeability measurements can be regarded as meaning nothing more than a measure to show water resistance of the coating, so far as such a sample as an aqueous dispersion coating that is highly susceptible to moisture is concerned.

(J) Boiling water treatment

A coated film wrapped in a gauze was immersed for 30 minutes in mildly boiling water with a thermometer indication ranging from 95° C. to 100° C. After being taken out of the boiling water, the coated film was put between filter paper sheets to absorb water drips deposited on its surface.

EXAMPLE 1

1.99 Parts of methacrylic acid was added to 100 parts of a mixture consisting of 92.74 parts of vinylidene chloride, 5.93 parts of methyl methacrylate and 1.33 parts of methacrylonitrile to obtain a monomer mixture. An aqueous solution consisting of 90 parts of deionized water, 0.08 parts of sodium dodecylbenzenesulfonate and 0.05 parts of sodium persulfate was added to a 200 liter glass-lined stirred pressure reactor. 10 Percent of the monomer mixture was then added to the aqueous solution to form a resultant mixture. The reactor was purged with gaseous nitrogen ($N_2$), kept under an $N_2$ blanket and sealed. 0.45 Parts of sodium persulfate were added to a sufficient amount of deionized water to form a dilute aqueous solution of sodium persulfate containing about 10 percent sodium persulfate based on weight of the aqueous solution. The dilute aqueous solution of sodium persulfate was added to the resultant mixture under agitation at a generally constant rate for 18 hours while keeping reactor contents at a temperature of 55° C. The dilute aqueous solution of sodium persulfate was added with a small metering pump. The generally constant rate was such that 0.028 parts of sodium persulfate were added per hour.

When the 10 percent of the monomer mixture had been almost completely polymerized as monitored through a change in the internal pressure of the reactor of 0.2 kilograms per square centimeter, a 20 percent aqueous solution containing about 0.65 parts of sodium lauryl sulfate in deionized water was charged into the reactor. Succeedingly, the whole of the remaining monomer mixture (90% of the monomer mixture prepared initially) was continuously added to the reactor at such a rate that the addition was completed over a period of about 15 hours. It is to be noted here that in the course of adding the remaining monomer mixture, the aqueous solution of sodium persulfate was also added continuously at the rate of 0.28 parts of sodium persulfate per hour. Also, addition of the sodium persulfate solution was stopped when monomer addition was stopped. After the monomer addition was stopped, the contents of the reactor were maintained at a temperature of about 55° C. for an additional period to further the reaction until the internal pressure reached a sufficiently low level of negative pressure to obtain an intended aqueous dispersion.

After the internal pressure had reached the sufficiently low level, a sufficient amount of a 20 percent aqueous solution of sodium lauryl sulfate was added to the aqueous dispersion to adjust its surface tension to 42 dynes/cm at 20° C. Steam was then blown through the aqueous dispersion at a rate of 4 percent an hour, based on the aqueous dispersion, while maintaining a reduced internal pressure of −500 to −600 millimeters of mercury to keep the aqueous dispersion at 60° C. This treatment removed unreacted residual monomers to such an extent that the aqueous dispersion contained not more than 10 ppm of unreacted residual vinylidene chloride monomer. Thereafter, the thus treated aqueous dispersion was dialyzed against pure water through a cellulosic semipermeable membrane so as to minimize dialyzable hydrophilic substances contained therein. The dialysis was continued until the specific electric conductivity of the aqueous dispersion was below $2.5 \times 10^{-3} \Omega \text{cm}^{-1}$ as measured using a commercial conductometer.

The formulations and compositions of the charged materials and the results of tests on the resultant aqueous dispersion are summarized in a Table together with similar data for succeeding examples and references (comparative examples). The Table follows the last reference.

EXAMPLE 2

Except that a monomer mixture consisting of 93.35 parts of vinylidene chloride, 3.98 parts of methyl methacrylate, 2.67 parts of methacrylonitrile and 2.01 parts of methacrylic acid was used instead of the monomer mixture of Example 1, the same procedure and conditions as those of Example 1 were repeated.

EXAMPLE 3

Except that a monomer mixture consisting of 93.96 parts of vinylidene chloride, 2.01 parts of methyl methacrylate, 4.03 parts of methacrylonitrile and 2.03 parts of methacrylic acid was used instead of the monomer mixture of Example 1, the same procedure and conditions as those of Example 1 were repeated.

Reference 1

Except that a monomer mixture consisting of 92.14 parts of vinylidene chloride, 7.86 parts of methyl methacrylate and 1.98 parts of methacrylic acid was used instead of the monomer mixture of Example 1, the same procedure and conditions as those in Example 1 were repeated.

Reference 2

Except that a monomer mixture consisting of 94.59 parts of vinylidene chloride, 5.41 parts of methacrylonitrile and 2.03 parts of methacrylic acid was used instead of the monomer mixture of Example 1, the same procedure and conditions as those of Example 1 were repeated.

In the aforementioned Examples 1, 2 and 3 as well as in References 1 and 2, it is to be noted that each monomer mixture used contained 90.3 mole percent of vinylidene chloride, based on monomer mixture, and about 2.2 mole percent of methacrylic acid, based on monomer mixture, with the remaining 7.5 mole percent, based on monomer mixture, being shared between methyl methacrylate and methacrylonitrile at varied ratios.

As is obvious from the Table, the three component system of References 1 and 2 lacking either methacrylonitrile or methyl methacrylate did not realize improved oxygen barrier properties (reduced oxygen permeability) after boiling water treatment. However, the four component system of Examples 1 through 3, according to the present invention, all show a remarkable reduction in oxygen permeability after boiling water treatment. As to the water vapor permeability, the difference between the examples of the present invention and the references is not so marked. The difference in water vapor permeability might become more remarkable if the coatings were tested under more severe conditions in which the water vapor permeability represents their water resistance more closely. Nevertheless, the data presented in the Table clearly shows that the four component system of the present invention is superior to the three component system of References 1 and 2 in respect of water vapor barrier properties as well as oxygen barrier properties.

Reference 3

Except that a monomer mixture consisting of 94.24 parts of vinylidene chloride, 3.45 parts of methyl methacrylate, 2.31 parts of methacrylonitrile and 3.06 parts of methacrylic acid was used instead of the monomer mixture of Example 1, the same procedure and conditions as those of Example 1 were repeated.

In the formulation of Reference 3, the monomer mixture contained 90.3 mole percent of vinylidene chloride, like the monomer compositions of the foregoing Examples 1 through 3 and References 1 and 2. The methacrylic acid content was increased to 3.3 mole percent, one and a half times that of the foregoing examples or references. The remaining 6.4 mole percent was shared equally between methyl methacrylate and methacrylonitrile. Thus, Reference 3 could be regarded as a modification of Example 2, in which only the methacrylic acid content was increased from the level of Example 2, as understood from the Table.

Also as shown in the Table, in Reference 3, the methacrylic acid content titrated with a 1/20N aqueous sodium hydroxide solution was lower than 60% of the total methacrylic acid content but higher than $1.3 \times 10^{-4}$ moles per gram of polymer solids content. The resultant coating did not have improved oxygen barrier properties (reduced oxygen permeability) after boiling water treatment as intended by the present invention.

Reference 4

Except that a monomer mixture consisting of 92.74 parts, 5.93 parts of methyl methacrylate, 1.33 parts of methacrylonitrile and 1.68 parts of acrylic acid was used instead of the monomer mixture of Example 1, the same procedure and conditions as those of Example 1 were repeated. In Reference 4, the monomer mixture was formulated by using the same molar ratio as that of Example 1 except that methacrylic acid was changed to acrylic acid. The distribution of carboxyl groups or acrylic acid units of the resultant aqueous vinylidene chloride resin dispersion fell outside the specific range required by the present invention. Consequently, it was not possible to achieve improved oxygen barrier properties (reduced oxygen permeability) after boiling water treatment as intended by the present invention.

TABLE

| Examples and References | Formulation of Monomer Mixture Charged (Calculated) | | MAA Content ($\times 10^{-4}$ moles/gram polymer solids) | Chloride Content (%) | Nitrogen Content (%) | Carboxyl Group Content ($\times 10^{-4}$ mol/g polymer solids) | | B + A (%) |
|---|---|---|---|---|---|---|---|---|
| | VDC Content (mol %) | MMA/MAN (molar ratio) | | | | Titration A | Titration B | |
| Reference 1 | 90.3 | 4/0 | 2.24 | 66.3 | — | 1.8 | 0.7 | 39 |
| Example 1 | 90.3 | 3/1 | 2.25 | 66.3 | 0.30 | 1.8 | 0.9 | 50 |
| Example 2 | 90.3 | 2/2 | 2.27 | 66.7 | 0.58 | 1.6 | 0.8 | 50 |
| Example 3 | 90.3 | 1/3 | 2.29 | 67.1 | 0.86 | 1.7 | 0.85 | 50 |
| Reference 2 | 90.3 | 0/4 | 2.29 | 67.6 | 1.08 | 1.9 | 0.8 | 42 |
| Reference 3 | 90.3 | 2/2 | 3.42 | 66.7 | 0.50 | 2.7 | 1.6 | 59 |
| Reference 4 | 90.3 | 3/1 | AA 2.28 | 66.4 | 0.29 | 2.0 | 2.0 | 100 |

VDC = Vinylidene Chloride
MMA = Methyl Methacrylate
MAN = Methacrylonitrile
MAA = Methacrylic Acid
AA = Acrylic Acid
*grams of water/square meter/24 hours at 40° Centigrade and 90% relative humidity
**cubic centimeter of oxygen/square meter/24 hours at atmospheric pressure and at 20° Centigrade and 100% relative humidity

TABLE

| Examples and References | Adhesiveness to Substrate | Printing Ink Adhesiveness (%) | Water Vapor Permeability *(g/m²/24 hr) | Oxygen Permeability (cc/m²/24 hr · atm)** | | Haze After Boiling |
|---|---|---|---|---|---|---|
| | | | | Before Boiling | After Boiling | |
| Reference 1 | Good | 100 | 4.1 | 3.1 | 8.0 | Good |
| Example 1 | Good | 100 | 3.9 | 2.6 | 5.1 | Good |
| Example 2 | Good | 100 | 3.5 | 2.3 | 4.8 | Good |
| Example 3 | Good | 100 | 3.7 | 2.1 | 4.3 | Good |
| Reference 2 | Good | 100 | 4.2 | 2.1 | 8.9 | Good |
| Reference 3 | Good | 100 | 4.1 | 2.7 | >10 | Good |
| Reference 4 | Good | 100 | 4.2 | 2.7 | >10 | Good |

VDC = Vinylidene Chloride
MMA = Methyl Methacrylate
MAN = Methacrylonitrile
MAA = Methacrylic Acid
AA Acrylic Acid = Acrylic Acid
*grams of water/square meter/24 hours at 40° Centigrade and 90% relative humidity
**cubic centimeter of oxygen/square meter/24 hours at atmospheric pressure and at 20° Centigrade and 100% relative humidity As clearly seen from any of the foregoing references, the use of acrylic acid or methacrylic acid in an aqueous vinylidene chloride resin dispersion is certainly effective to improve the adhesiveness to substrate and printability. The use of acrylic acid or methacrylic acid inevitably reduces the gas permeability after boiling water treatment so long as such formulations as the references are used. However, the foregoing examples in accordance with the present invention are all significantly effective in improving the boiling water resistance of coatings of aqueous vinylidene chloride resin dispersions. In addition, adhesiveness and printability are maintained at desired levels.

What is claimed is:

1. An aqueous dispersion of a vinylidene chloride resin obtained by emulsion polymerizing a mixture of vinylidene chloride as a major component, methyl methacrylate, methacrylonitrile, and methacrylic acid; said aqueous dispersion having an aqueous phase and a polymer solids phase, the polymer solids phase having polymerized therein from about 87 to about 93 mole percent vinylidene chloride based on polymer solids content, from about 13 to about 7 mole percent of a mixture of methyl methacrylate and methacrylonitrile, based on polymer solids content, and an amount of methacrylic acid, said amount together with a titratable amount of methacrylic acid comprising a total amount of methacrylic acid, the total amount being from $1 \times 10^{-4}$ to about $3 \times 10^{-4}$ moles of methacrylic acid per gram of polymer solids content, the titratable amount being an amount which exists in a form titratable with a 1/20 Normal aqueous solution of sodium hydroxide, the titratable amount not exceeding the lesser of (a) about $1.3 \times 10^{-4}$ moles per grams of polymer solids content and (b) about 60 percent of the total amount of methacrylic acid.

* * * * *